United States Patent [19]

Matsumoto

[11] 4,244,333
[45] Jan. 13, 1981

[54] INDUCTION SYSTEM FOR AN INTERNAL COMBUSTION ENGINE

[75] Inventor: Hiromitsu Matsumoto, Hamamatsu, Japan

[73] Assignee: Yamaha Hatsukoki Kabushiki Kaisha, Iwata, Japan

[21] Appl. No.: 937,712

[22] Filed: Aug. 29, 1978

[30] Foreign Application Priority Data

Mar. 9, 1977 [JP] Japan ............................. 52/106028

[51] Int. Cl.³ ...................... F02B 17/00; F02B 3/00
[52] U.S. Cl. .............................. 123/432; 123/52 M; 261/23 A; 261/39 A
[58] Field of Search ............ 123/103 R, 127, 122 AB, 123/122 AC, 75 B; 261/23 A, 65 R, 39 A

[56] References Cited

U.S. PATENT DOCUMENTS

| | | | |
|---|---|---|---|
| 2,395,264 | 2/1946 | Gardner | 261/23 A |
| 3,554,174 | 1/1971 | Clawson | 123/127 |
| 3,659,564 | 5/1972 | Suzuki | 123/122 A |
| 4,002,704 | 1/1977 | Laprade | 261/23 A |
| 4,018,199 | 4/1977 | Furucz | 123/127 |
| 4,151,820 | 5/1979 | Furacz | 123/127 |

FOREIGN PATENT DOCUMENTS 2617728  5/1977  Fed. Rep. of Germany ........ 261/39 A

*Primary Examiner*—Ronald H. Lazarus
*Attorney, Agent, or Firm*—Ernest A. Beutler

[57] ABSTRACT

Two embodiments of induction systems for internal combustion engines having, in addition to the normal main induction passages, smaller cross-sectional area sub induction passages. The intake charge during idle and low load conditions is delivered to the engine cylinders through the sub induction passage to promote turbulence and improve combustion efficiency under these running conditions. The high load requirements of the engine are supplied through the main induction passage so as to improve volumetric efficiency and reduce pumping losses. Throttle valves control the proportion of the flow through the respective induction passages. In accordance with one embodiment of the invention, the throttle valve which controls the flow through the sub induction passage is positioned as close as possible to the chambers so as to improve intake efficiency. In another embodiment of the invention, at least one of the flow control throttle valves is positioned in a separate housing which has an extremely smooth bore to minimize leakage and to offer lower manufacturing costs.

9 Claims, 5 Drawing Figures

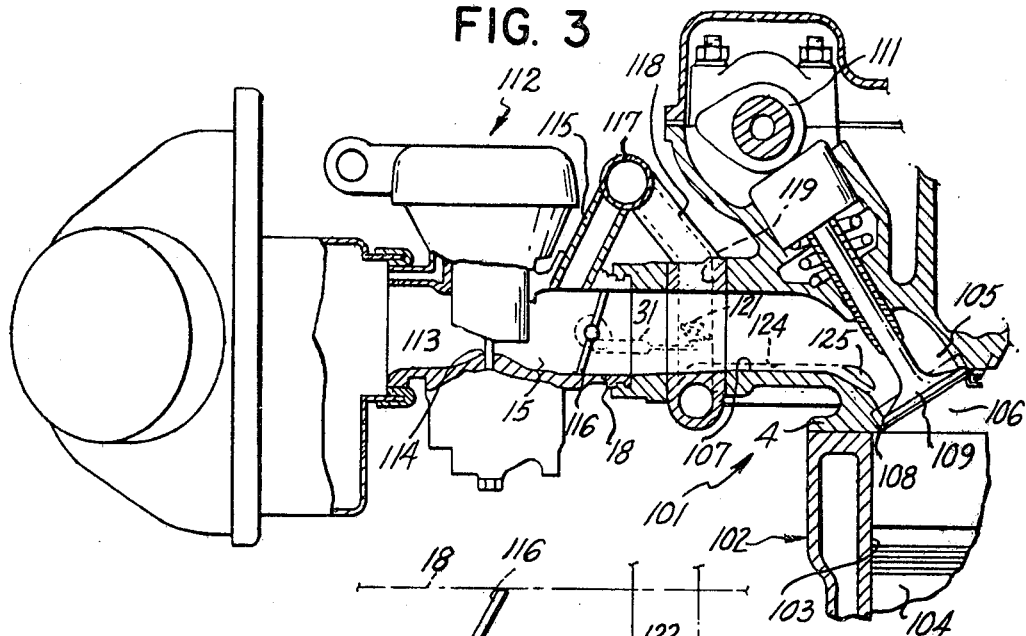
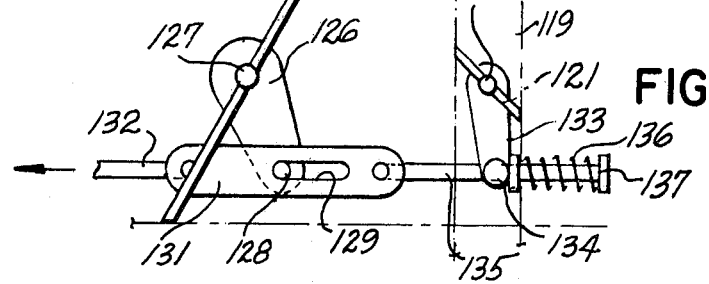
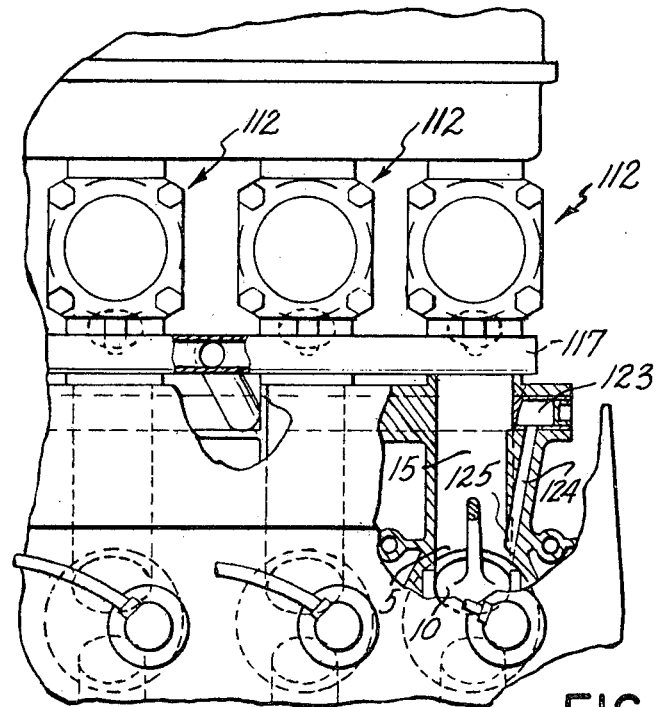

INDUCTION SYSTEM FOR AN INTERNAL COMBUSTION ENGINE

BACKGROUND OF THE INVENTION

This invention relates to an induction system for an internal combustion engine and more particularly to an induction system that offers improved engine performance throughout the performance range of the engine.

It has been recently discovered that the idle and low speed performance of an engine may be improved by delivering the mixture to the engine chambers under this running condition through a separate, relatively small sub or auxiliary passage. The use of the small auxiliary induction passage causes the intake mixture to enter the chambers at a substantially greater velocity to increase turbulence in the chamber at the time of ignition. This greatly improves the speed of flame propagation and combustion efficiency. As a result, the emission of unwanted exhaust gas constituents may be reduced and, at the same time, fuel economy increased.

The proportion of flow to the chambers through the auxiliary and main induction passages is controlled by one or more throttle valves which control the flow through at least one of these passages. It has been found that performance may deteriorate due to the induction of a volume of mixture which has been trapped between the closed valve of the main induction system and the chamber, which results in a reduction in induction velocity through the auxiliary passage.

It is, therefore, a principal object of this invention to provide an improved induction system for an internal combustion engine.

It is another object of this invention to provide an engine induction system that offers improved performance throughout the engine load range and good transitional performance.

In connection with an induction system of the type described, when applied to a multiple cylinder engine, the aforenoted effects may be avoided by interconnecting a portion of the auxiliary induction passages downstream of the control valve and with the main induction passage. In this way, a sub atmospheric pressure can be generated in the trapped volume for improving the air flow and minimizing the aforenoted effects.

In connection with the type of induction system previously described including main and auxiliary induction passages, it has also been found important to prevent leakage past the throttle valve which should be closed at idle and low load conditions. This assists in maintaining the sub atmospheric pressure as described in the preceding paragraph. Although this leakage can be substantially eliminated by maintaining an extremely good surface finish between the throttle valve and the passage which it controls, the geometry of the induction manifold may not always permit such machining. Furthermore, machining of the entire manifold surface to achieve this result is unduly expensive.

It is, therefore, a further object of this invention to provide an improved control valve system for the induction system of an internal combustion engine.

It is another object of the invention to provide an induction system control valve that affords good sealing at low cost.

SUMMARY OF THE INVENTION

A first feature of this invention is adapted to be embodied in an induction system for a multiple cylinder internal combustion engine having a plurality of variable volume chambers in which combustion occurs. A plurality of main induction passages each communicate with a respective one of the variable volume chambers. Each of a plurality of auxiliary induction passages of substantially lesser effective cross-sectional area than the main induction passages also communicate with a respective one of the variable volume chambers. Principal throttle valve means control the flow through the main induction passages and auxiliary throttle valve means control the flow through the auxiliary induction passages. In connection with this embodiment of the invention, the auxiliary induction passages each communicate with the principal induction passages downstream from the principal throttle valve means and means communicate the auxiliary induction passages with each other for maintaining the pressure in the principal induction passages downstream of the principal throttle valve means at a pressure less than atmospheric when the engine is running.

In accordance with another feature of the invention, a throttle valve arrangement is provided that ensures complete sealing when the throttle valve is closed. In connection with this feature, an engine is provided with a relatively long inlet tract in which a butterfly type throttle valve is positioned. A separate housing rotatably supports the throttle valve and forms only a small portion of the inlet tract. The housing has a smooth surface cylindrical bore formed therein with which the throttle valve cooperates.

BRIEF DESCRIPTION OF THE DRAWINGS

FIG. 3 is a cross-sectional view, in part similar to FIG. 1, showing another embodiment of the invention;

FIG. 4 is a partial top plan view, in part similar to FIG. 2, showing the engine in the embodiment of FIG. 3 with portions broken away; and FIG. 5 is a partially schematic side elevational view showing the throttle linkage of the embodiments of FIGS. 3 and 4.

DETAILED DESCRIPTION OF THE PREFERRED EMBODIMENTS

Figure 1:
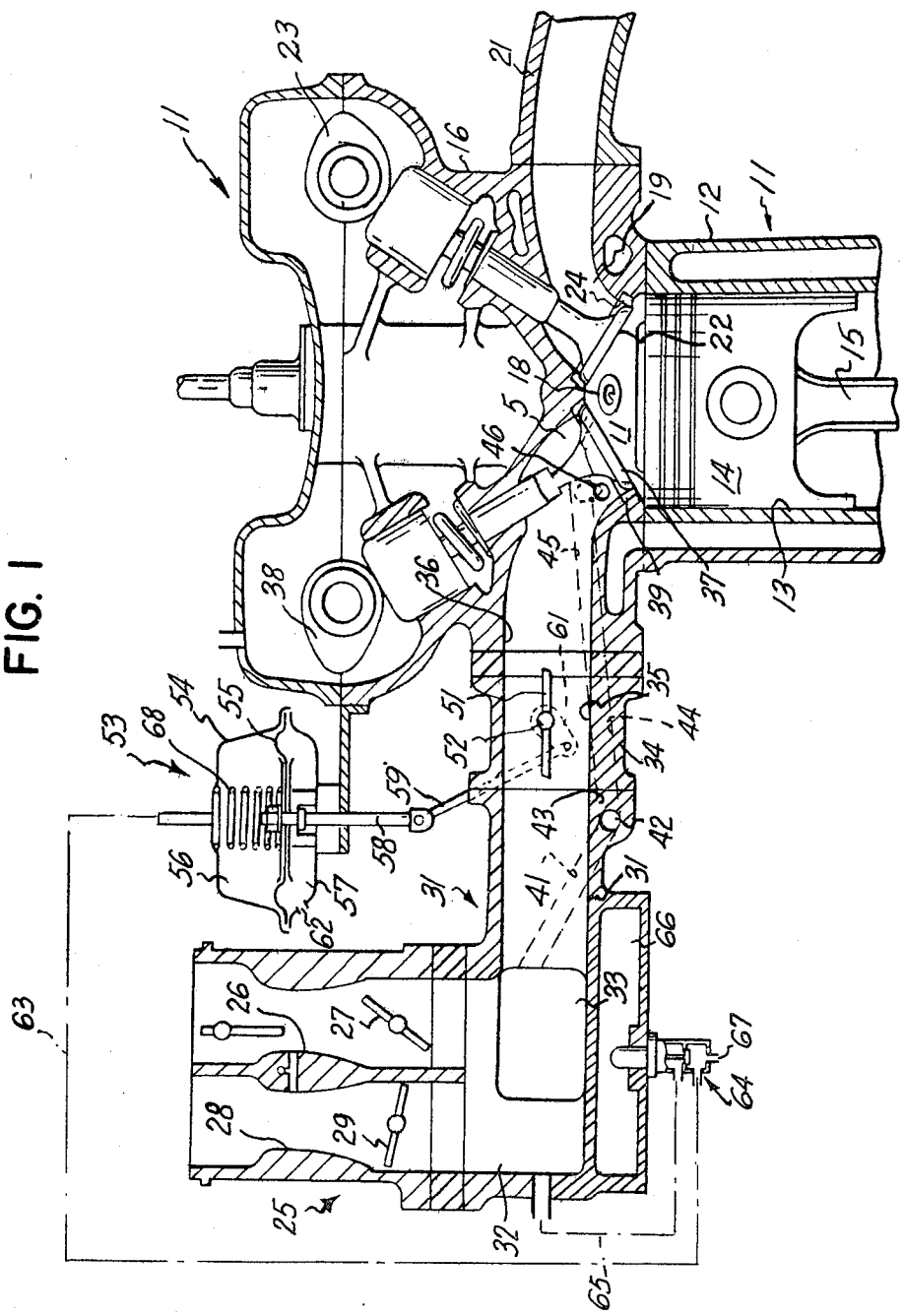
FIG. 1 is a cross-sectional view taken through a single cylinder of a multiple cylinder internal combustion engine embodying this invention and is taken generally along the line 1—1 of FIG. 2.
Figure 2:
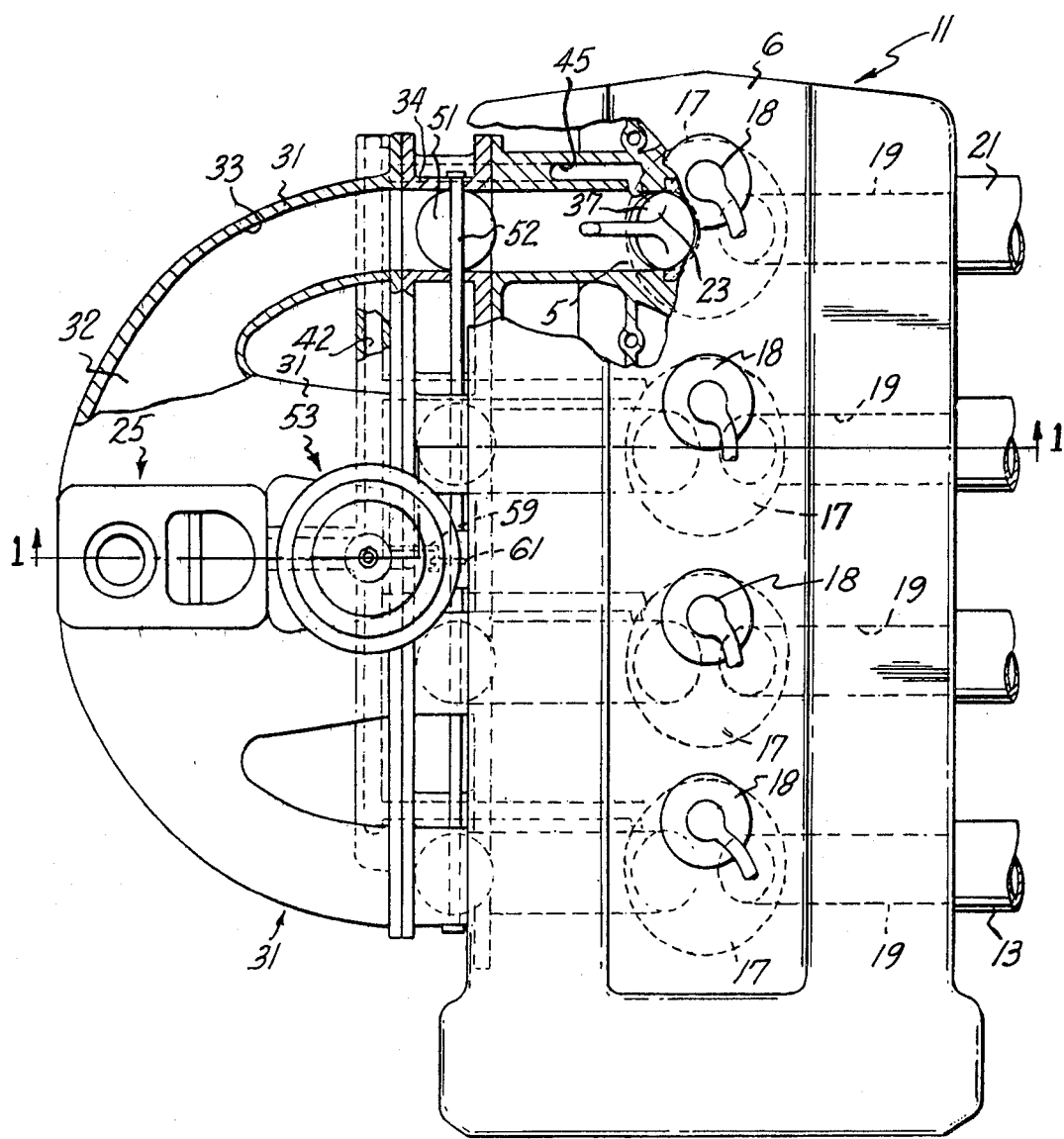
FIG. 2 is a top plan view, with parts broken away, of the engine shown in FIG. 1.

Referring first to the embodiment of FIGS. 1 and 2, a four cylinder overhead cam shaft internal combustion engine embodying this invention is identified generally by reference numeral 11. The engine 11 includes a cylinder block 12 in which four cylinder bores 13 are formed. Pistons 14 are supported for reciprocation in the bores 13 and drive a crankshaft (not shown) by means of connecting rods 15.

A cylinder head 16 is affixed to the cylinder block 12 and has respective recesses which define variable volume chambers 17 with the cylinder bores 13 and pistons 14.

The charge delivered to the chambers 17 by the induction system, to be described, is fired by a respective spark plug 18 in a known manner. The burnt charge is exhausted from each chamber 17 through an exhaust passage 19, formed at one side of the cylinder head 16, into an exhaust manifold 21. An exhaust valve 22, operated by a cam shaft 23, cooperates with an exhaust valve seat 24 formed at the inlet end of the cylinder head exhaust passage 19 for controlling the communication between each chamber 17 and its cylinder head exhaust passage 19.

The induction system for the engine 11 includes a two-barrel staged carburetor 25 having a primary barrel 26 and flow controlling throttle valve 27 and secondary barrel 28 having a flow controlling throttle valve 29. The carburetor 25 may be considered to be conventional in construction and, for that reason, will not be described in detail.

The carburetor 25 discharges its mixture into an intake manifold, indicated generally by the reference numeral 31. The manifold 31 has a plenum chamber 32 into which the carburetor 25 discharges. Main intake passages 33 run from the plenum 32 to the individual chambers 17, as will become apparent.

Interposed between the manifold 31 and the intake side of the cylinder head 16 is a valve housing assembly 34. The valve housing assembly 34 is comprised of four tubular sections, one for each chamber 17, in which highly polished bores 35 are formed. The bores 35 align with the discharge end of the intake manifold passages 33 and with intake passages 36 formed in the cylinder head 16. Intake valves 37 operated by an intake cam shaft 38 cooperate with intake valve seats 39 to control the communication of the cylinder head intake passages 36 with the chambers 17 in a known manner.

In addition to the main intake passages serving each of the chambers 17 (passages 33, 35 and 36), a sub or auxiliary intake system serves to communicate a charge from the carburetor 25 to each of the chambers 17. The auxiliary intake system is comprised of an inlet passage 41 that extends through the intake manifold casting 31 from the plenum 32 contiguous to the point of discharge of the primary carburetor barrel 26. The auxiliary inlet passage 41 extends to a transverse auxiliary induction passage 42 formed in the intake manifold 31 contiguous to the throttle valve block 34. Small runner passages 43 interconnect the transverse passage 42 with individual auxiliary induction passages 44 formed in the valve block 34. The auxiliary induction passages 44 each cooperate with respective cylinder head auxiliary induction passages 45 which terminate in auxiliary induction ports 46. The ports 46 discharge into the main cylinder head intake passages 36 contiguous to the heads of the intake valves 37.

The effective cross-sectional area of the described auxiliary induction system is substantially less than that of the main induction system so that a given mass flow rate of charge passing through the auxiliary induction system will issue from the port 46 at a substantially greater velocity than the same charge if discharged from the main intake ports. If desired, the ports 46 and passages 45 may be disposed in such a way as to cause the charge inducted into the chambers 17 from the auxiliary induction system to enter in a swirling manner.

A throttle valve arrangement, now to be described, is provided for controlling the proportion of the mixture inducted into chambers 17 from the auxiliary and main induction systems. In a preferred embodiment of the invention, the low and idle mixture charge is all supplied from the sub or auxiliary induction system. In this way, the charge will enter the chambers 17 at a substantially higher velocity to permit turbulence at the time of ignition by the spark plugs 18. This has been found to significantly increase the rate of flame propagation and, accordingly, improve combustion.

The throttle arrangement comprises an auxiliary throttle valve 51 positioned in each of the valve block passages 35 and affixed to a common throttle valve shaft 52. Since the passages 35 are accurately formed, when the throttle valves 51 are closed substantially no flow may occur through these passages. As will become apparent, this is particularly important in connection with this invention.

The position of the throttle valves 51 is controlled by a vacuum motor, indicated generally by the reference numeral 53. The vacuum motor 53 is comprised of a housing 54 in which a flexible diaphragm 55 is positioned to divide the interior of the housing 54 into upper and lower chambers 56, 57. The diaphragm 55 is connected to a rod 58 which is, in turn, connected by a link 59 to the throttle valve shaft 52 by means of a lever 61.

The vacuum motor chamber 57 is vented to the atmosphere by means of an atmospheric port 62. The chamber 56 senses induction system vacuum by means of a conduit 63, temperature responsive valve 64 and conduit 65 that enters into the induction manifold 31 at the plenum 32. The temperature responsive valve 64 is inserted into a hot water jacket 66 of the intake manifold 31 so as to sense the temperature of the coolant in the engine 11.

When the coolant and engine is below a predetermined temperature, the valve 64 opens the conduit 63 to atmospheric pressure via a vent 67. A coil spring 68 in the motor 57 will urge the diaphragm 55 downwardly under this condition to hold the throttle valves 51 in their fully opened position, as shown in the drawings.

When the engine 11 reaches a predetermined temperature, the valve 64 will be actuated to close the vent 67 and open communication of the vacuum motor chamber 56 with the intake manifold plenum 32 via the conduits 63 and 65. When the engine is running at low and medium loads the vacuum in the induction system and particularly the plenum 32 will be low causing a reduction in pressure in the vacuum motor chamber 56. Atmospheric pressure acting on the chamber 57 will urge the diaphragm 55 upwardly to close the throttle valves 51. Induction flow will, therefore, be shunted through the sub or auxiliary induction system consisting of the inlet 41, passage 42, passages 44 and 45, and ports 46. As has been previously noted, the charge will then enter the chamber 17 at a high velocity to offer the improved combustion performance previously described.

Any leakage passed the throttle valves 51 during the condition should be avoided. By providing the separate throttle block 34 with the machined surface 35 a good sealing closure is obtained. Although this could be achieved with conventional throttle arrangements by machining the portion of the manifold in which the throttle valves 51 were positioned, the machining of a complex induction passage shape is extremely difficult and, at times, impossible depending upon location. Thus, by using the separate throttle block this result is obtained without significant cost penalty.

Since the charge inducted through the sub intake system described passes through the main cylinder head induction passage 36, there is a possibility of induction of the mixture with the relatively large volume of mixture which might be present in the portion of the main induction passage between the intake valves 37 and the sub throttle valves 51. This will have the effect of undesirably reducing the velocity of the inducted gasses. In order to prevent this velocity reduction, it is desirable to maintain this volume as small as possible. One way this can be done is by positioning auxiliary or sub throttle valves 51 as close as possible to the main intake valves 37.

Another way of achieving this same result is to ensure that the pressure in this trapped volume (volume between valves 37 and 51) is as low as possible. Since the individual sub or auxiliary intake passages 45 are all communicated with each other through the passage 42 the suction occuring during the intake stroke of one piston 14 will be transmitted to the volumes trapped in the main intake passages of the remaining chambers. Thus, all of the main intake passages will be maintained at less than atmospheric pressure during the running of the engine. This also has the effect of improving the running characteristics of the engine during the transition from the time when the sub throttle valves 51 are fully closed to the time when they open.

As the load on the engine 11 increases, eventually the pressure in the induction system will increase to a point where the atmospheric pressure in the chamber 57 no longer fully overcomes the force of the spring 68. The sub or auxiliary throttle valves 51 will then be opened so that a portion of the mixture requirement of the engine will be supplied through the main induction system comprised of the passages 33, 35 and 36. When the throttle valves 51 reach their fully opened position, substantially all of the intake charge will pass through this main intake system.

FIGS. 3 through 5 illustrate another embodiment of the invention in which the control valves for determining the amount of flow through the auxiliary or sub intake passages are positioned directly in these passages. In this embodiment, the position of the valves for controlling the flow through the auxiliary induction passage is determined not by intake vacuum but rather by throttle valve opening.

Referring now to these figures, a multiple cylinder internal combustion engine constructed in accordance with this embodiment is identified generally by reference numeral 101. The engine 101 includes a cylinder block 102 in which cylinder bores 103 are formed. Pistons 104 are reciprocally supported in the cylinder bores 103.

The cylinder head 105 is affixed to the cylinder block 102 and is formed with a number of chambers 106 that cooperate with the cylinder bores 103 and pistons 104 to form variable volume combustion chambers. A main intake passage 107 is formed in the cylinder head 105 for each cylinder bore 103 and terminates at a valve seat 108. An intake valve 109, controlled by a cam shaft 111, controls the flow through the main intake passage 107.

In connection with this embodiment, an individual air valve type carburetor, indicated generally by the reference numeral 112, is provided for each cylinder bore 103. As is well known, each carburetor 112 has a sliding piston 113 that cooperates with a venturi 114 to provide an air flow area that is related to the induction system vacuum. This type of carburetor is well known and, for that reason, will not be further described.

Each carburetor 112 is provided with a sub or auxiliary induction system intake pipe 115 downstream of its piston 113 but upstream of the main throttle valve 116. The inlet pipes 115 of the auxiliary induction system are all connected to a common manifold pipe 117 from which branch individual delivery pipes 118 terminating in a vertically extending passage 119 in which individual auxiliary or sub throttle valves 121 are supported for rotation for controlling the flow through these sub intake passages. The throttle valves 121 are all affixed to a common shaft 122 for actuation in a manner to be described.

Each of the vertically extending passages 121 merge into a common transversely extending passage 123. The passages 123 feed cylinder head sub intake passages 124 that terminate in sub intake ports 125 which are juxtaposed to the intake valves 109 and positioned within the main intake ports 107.

The throttle control mechanism will now be described by particular reference to FIG. 5. A lever 126 is affixed to a shaft 127 to which the main throttle valves 116 are affixed. The lever 126 has a pin 128 that extends into a slot 129 formed in a link 131 to provide a lost motion connection, for a reason to be described. A rod 132 is connected to the link 131 at one of its ends and is actuated by the accelerator pedal of the associated vehicle, in a known manner.

A lever 133 is affixed to the auxiliary throttle valve shaft 121 and has a trunnion 134 that receives an actuating rod 135. A spring 136 bears against the trunnion 134 and a head 137 of the rod 135. The opposite end of the rod 135 is pivotally connected to the link 131.

FIG. 5 illustrates the throttle link in the idle position. The degree of opening of the sub throttle valves 121 may be controlled by an adjustable stop (not shown). The main throttle valves 116 will be fully closed in this condition so that all of the mixture requirement is delivered to the chambers 106 through the sub induction system as in the previously described embodiment.

To open the throttle valves 116 and 121, a pull to the left is exerted on the accelerator link 132 which causes the link 131 and rod 135 also to move to the left. Because of the length of the slot 129, initial movement in this direction will not cause any opening of the throttle valves 116. As the linkage described moves to the left the sub throttle valves 121 will be moved toward their fully opened position increasing the amount of mixture flowing to the chambers 106 through the sub induction system. When the end of the slot 129 reaches the pin 128, continued movement of the link 131 will cause initial opening of the main throttle valves 116. A portion of the mixture will then be delivered to the chambers 106 through the main induciton system, also as in the previously described embodiment.

It should be noted that the sub throttle valves 121 will reach their fully opened position prior to full opening of the main throttle valves 116. In order to accommodate this, a spring 136, which normally applies the opening force to the sub throttle valves 121 will yield and permit continued movement of the main throttle valves 116 to their fully opened position. This in effect provides a lost motion connection between the throttle linkage and the sub throttle valves 121.

The sub throttle valves 121 are urged toward their closed position by means of a return spring arrangement (not shown) and closure of the throttle valves will operate in a sequence opposite to that previously described.

In connection with this embodiment, the sub induction system between the respective chambers communicates with each other through the passages 117 and 123. Therefore, the volume between the main throttle valves 116 and the intake valves 109 will always be maintained at a pressure that is less than atmospheric even though both of these valves are fully closed. The advantages of this have already been described in connection with the preceding embodiment and will not be repeated here.

It is to be understood that the foregoing description is that of preferred embodiments and that the invention is susceptible to variations and modifications without departing from the spirit and scope of the invention, as defined by the appended claims.

I claim:

1. In an induction system for a multiple cylinder engine having a plurality of variable volume chambers in which combustion occurs, a plurality of main induction passages, each communicating with a respective variable volume chamber, a plurality of auxiliary induction passages, each communicating with a respective of said variable volume chambers, said auxiliary induction passages having a substantially lesser effective cross-sectional area than said main induction passages so that a given mass flow through said auxiliary induction passages enters the respective chambers at a substantially greater velocity than the same mass flow through said main induction passages, primary throttle valve means for controlling the flow through said main induction passages to the respective chambers, and auxiliary throttle valve means controlling the flow through said auxiliary induction passages to the respective chambers, the improvement comprising said auxiliary induction passages each communicating with said primary induction passages downstream from said main throttle valve means and balance passage means communicating said auxiliary induction passages with each other for maintaining the pressure in said main induction passage downstream of said main throttle valve means at a pressure less than atmospheric.

2. An induction system as set forth in claim 1, wherein the main throttle valve means comprises a separate throttle valve in each main induction passage.

3. An induction system as set forth in claim 1, wherein the auxiliary throttle valve means comprises a separate throttle valve in each auxiliary induction passage.

4. An induction system as set forth in claim 1, wherein the balance passage means communicates the auxiliary induction passages with each other downstream of the main throttle valve means.

5. An induction system as set forth in claim 1, wherein the balance passage means communicates the auxiliary induction passages with each other downstream of the auxiliary throttle valve means.

6. An induction system as set forth in claim 5, wherein the balance passage means communicates the auxiliary induction passages with each other downstream of the main throttle valve means.

7. An induction system as set forth in claims 1, 2 or 4, wherein the main throttle valve means is positioned in close proximity to the variable volume chambers for minimizing the volume between said chambers and said main throttle valve means in said main induction passage.

8. An induction system as set forth in claim 1, wherein the main throttle valve means comprises a butterfly-type valve, at least one of said main induction passages having a separate segment rotatably supporting said butterfly valve, said segment having a smooth finally finished bore for sealing said butterfly valve when said butterfly valve is in its closed position.

9. An induction system as set forth in claim 8, wherein there is a main throttle valve as defined in claim 8 in each of the main induction passages, the segments supporting each of said throttle valves being integral with each other.

* * * * *